US009019415B2

(12) United States Patent
Ma et al.

(10) Patent No.: US 9,019,415 B2
(45) Date of Patent: Apr. 28, 2015

(54) METHOD AND APPARATUS FOR DUAL CAMERA SHUTTER

(71) Applicant: QUALCOMM Incorporated, San Diego, CA (US)

(72) Inventors: Wan Shun Vincent Ma, San Diego, CA (US); Hung-Hsin Wu, San Diego, CA (US); Karthikeyan Shanmugavadivelu, San Diego, CA (US); Adarsh Abhay Golikeri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 13/662,368

(22) Filed: Oct. 26, 2012

(65) Prior Publication Data

US 2014/0028885 A1  Jan. 30, 2014

Related U.S. Application Data

(60) Provisional application No. 61/676,283, filed on Jul. 26, 2012.

(51) Int. Cl.
*H04N 5/222* (2006.01)
*H04N 5/232* (2006.01)

(52) U.S. Cl.
CPC ........ *H04N 5/23216* (2013.01); *H04N 5/23219* (2013.01); *H04N 5/23245* (2013.01); *H04N 5/23293* (2013.01)

(58) Field of Classification Search
USPC ....................................................... 348/333.1
See application file for complete search history.

(56) References Cited

U.S. PATENT DOCUMENTS

| 6,614,996 | B2 | 9/2003 | Okisu et al. |
| 7,417,679 | B2 | 8/2008 | Kuruma |
| 8,203,640 | B2* | 6/2012 | Kim et al. ............... 348/333.12 |
| 8,654,237 | B2* | 2/2014 | Oh ............................. 348/333.03 |
| 2006/0181517 | A1* | 8/2006 | Zadesky et al. ............... 345/173 |
| 2007/0153111 | A1 | 7/2007 | Kato |
| 2008/0070646 | A1* | 3/2008 | Hamamura et al. ........ 455/575.3 |
| 2009/0073285 | A1* | 3/2009 | Terashima ............... 348/231.99 |
| 2010/0079589 | A1 | 4/2010 | Yoshida et al. |
| 2010/0208107 | A1 | 8/2010 | Nonaka et al. |
| 2011/0007177 | A1 | 1/2011 | Kang |
| 2011/0074971 | A1 | 3/2011 | Kwon |
| 2011/0113361 | A1 | 5/2011 | Bhatt et al. |

OTHER PUBLICATIONS

International Search Report and Written Opinion—PCT/US2013/050627—ISA/EPO—Nov. 14, 2013.

* cited by examiner

*Primary Examiner* — Gary C Vieaux
(74) *Attorney, Agent, or Firm* — Knobbe, Martens, Olson & Bear LLP

(57) ABSTRACT

Described herein are methods and devices that employ a dual shutter button feature associated with an image capture device to recommend a capture mode to a user based on one or more parameters analyzed by the image capture system. As described, providing a primary shutter button and a secondary shutter button enables the user to capture in both a standard capture mode by using the primary shutter button and in an alternate mode by using a secondary shutter button.

22 Claims, 8 Drawing Sheets

METHOD AND APPARATUS FOR DUAL CAMERA SHUTTER

CROSS-REFERENCE TO RELATED APPLICATIONS

The present application claims the benefit of U.S. Patent Application No. 61/676,283 filed Jul. 26, 2012, entitled "METHOD AND APPARATUS FOR DUAL CAMERA SHUTTER" and assigned to the assignee hereof. The disclosure of this prior application is considered part of, and is incorporated by reference in, this disclosure.

TECHNICAL FIELD

The present embodiments relate to imaging devices, and in particular, to methods and apparatus for the capture of images through a dual shutter button user interface.

BACKGROUND

Digital imaging capabilities have been integrated into a wide range of devices, including digital cameras, tablet computers, and mobile phones. Digital imaging devices or image capture systems can refer to any device that can capture one or more digital images, including devices that capture still images or videos.

The integration of digital processing technology with imaging devices has enabled more powerful and easier to use photographic products. For example, digital imaging devices may employ a variety of image capture modes. Each capture mode can correspond to optimized capture and processing settings for a particular image scene, such as a portrait or a low light scene.

Existing approaches implement alternate capture modes through a user interface which requires the user to find and manually select the capture mode. This complicated process has led many users to not activate the alternate capture modes. Average users may not find these alternate capture modes useful, as it can take a high level of knowledge on the available modes as well as an understanding of the scene to select the right mode. Further, the time and effort required to go through a user interface to select an alternate image capture mode may lead to nonuse of the alternate capture modes. Other existing approaches attempt to solve this problem by allowing the image capture device to select the capture mode based on automatic scene recognition with no input from the user. However this approach can deny the user the flexibility to determine whether the suggested capture mode is the correct choice for capturing a particular scene of interest.

SUMMARY

The dual capture techniques described herein make time-saving capture mode recommendations to the user and further allow the user to easily follow or ignore the capture mode recommendations through use of a dual shutter button user interface. In some circumstances, an image capture system may incorrectly estimate an image scene context and therefore a user may prefer not to select the recommended capture mode associated with the estimated context. In other circumstances, the user may simply decide not to use the recommended capture mode for reasons of personal preference. Regardless, it is beneficial to present a user with capture mode recommendations and allow the user the choice of following the recommendations or using a standard capture mode.

Some of the present embodiments may include techniques for utilizing a dual shutter button feature associated with an image capture device to recommend a capture mode to a user based on one or more parameters analyzed by the image capture system. By enabling a second shutter button in some circumstances, this enables the user to capture in both a standard capture mode by using the primary shutter button and in an alternate mode by using a secondary shutter button.

According to an embodiment, an image capture system comprises a sensor that converts light of an image into an electrical signal, a capture device that converts the electrical signal into preview image data, and a context estimation component that recognizes the type of scene to be photographed by analyzing the image data. In certain embodiments, the context estimation component may have access to data representing a plurality of capture modes, wherein each capture mode corresponds to a set of capture and processing settings. The context estimation component may recommend a capture mode having settings substantially optimized for the estimated context of the scene.

The image capture system may further comprise a user interface that presents a user with a first shutter button corresponding to a default capture mode. The user interface may, in some embodiments, additionally present a user with second shutter button corresponding to the recommended capture mode. In other embodiments, the user interface may display with the first shutter button a plurality of shutter buttons corresponding to a plurality of recommended capture modes.

The image capture system may further comprise a user input component that receives user input regarding a selected capture mode. Data representing the user selected capture mode may be sent to one or both of a context to capture settings mapping component and a context to post-processing settings mapping component. In some embodiments, the context to capture settings mapping component determines capture settings corresponding to the estimated context. Data representing these capture settings may be sent to the capture device, which may capture the image according to the capture settings. Digital data representing the image may be sent from the capture device to a post-processing component. In some embodiments, the post-processing settings mapping component determines post-processing settings corresponding to the estimated context. Data representing these post-processing settings may be sent to the post-processing component, which may modify the digital image data according to the post-processing settings.

DETAILED DESCRIPTION

Figure 1:
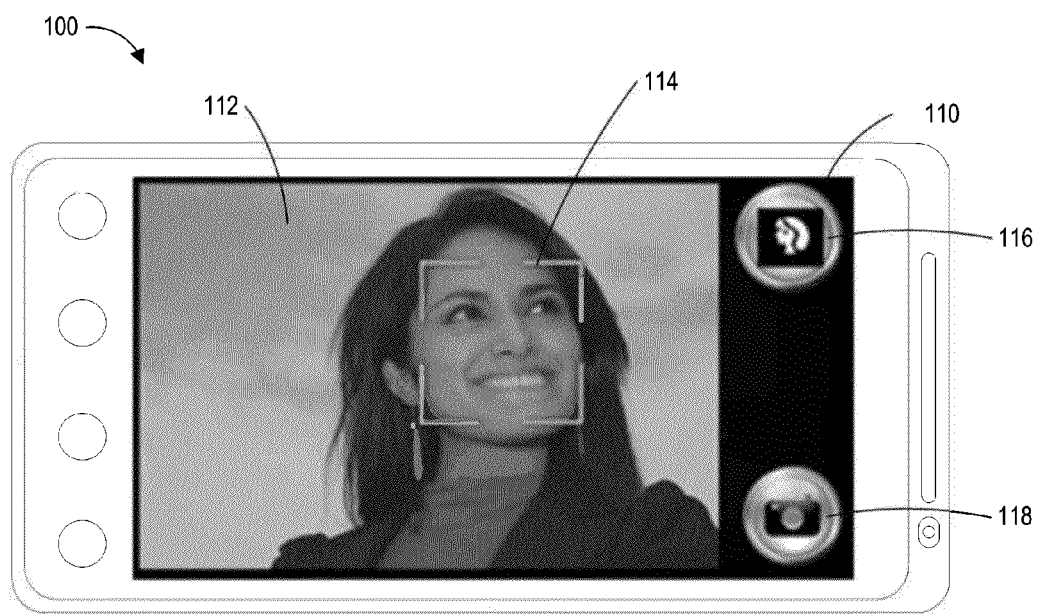
FIG. 1 illustrates an embodiment of a dual shutter button interface of an image capture device.

Implementations disclosed herein provide systems, methods and apparatus for capturing an image with a device configured to display context-specific shutter buttons to a user. Often, image capture devices such as digital cameras will be equipped with a display. The device may create a user interface on the display, for example by displaying a menu or touch activated buttons, and thus allow a user to make selections regarding camera settings. Such settings can include brightness and contrast of the image, in addition to f stop or exposure length. Many image capture devices are also configured with a standard mode and several alternate capture modes.

Particularly, some embodiments described herein relate to an image capturing device that has a user interface with two shutter buttons. A first shutter button corresponds to default camera shutter settings. This button is automatically displayed and may be selected by the user to capture the image using the default image capture settings. A second shutter button corresponding to context-specific settings can also be displayed. This second shutter button, for example, can be set to capture an image using settings optimized for a particular image context. For example the second button may activate shutter settings appropriate for taking a portrait photo or for taking a sports action shot. In one embodiment, the second shutter button is only displayed to the user when the image capture device has determined that such a context exists for the image.

If the user selects this second shutter button then the device will capture the image with the context-specific settings that are appropriate for the scene being captured. In some embodiments, more than one context-specific shutter button may be displayed for the user to choose between. For example, the display device may show 3, 4, 5, 6 or more different buttons, each designed to capture the scene of interest with different camera settings. The user may still select the first shutter button to capture the image using default settings if the user determines that none of the context-specific settings are desired.

One skilled in the art will recognize that these embodiments may be implemented in hardware, software, firmware, or any combination thereof. Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Referring now to FIG. 1, an exemplary dual shutter button interface 110 of an image capture device 100 will now be described in greater detail. As shown in FIG. 1, the image capture device 100 includes the dual shutter button interface 110, an image display portion 112, a portrait context indicator 114, a default shutter button 118 and a context-specific shutter button 116.

Although the image capture device 100 shown is a mobile phone, it will be understood by those skilled in the art that this is for purposes of illustration only and that the dual shutter button interface 110 may be employed in a variety of image capture devices such as an electronic camera, video recorder, a web camera, a camera built into a portable or mobile computer, including but not limited to, a cellular telephone, smart phone, portable media player, personal digital assistant, a laptop, or a tablet computer. Image capture device 100 may be a digital camera, such as a digital video camera, a digital still image camera, or a combination of both. Image capture device 100 may be a stand-alone device, such as a stand-alone camera, or be integrated in another multi-purpose device, such as a wireless communication device. Image capture device 100 may also be equipped to capture color imagery, black-and-white imagery, or both. In this disclosure, the term "image," or similar terms may interchangeably refer to either video or still pictures.

The image capture device 100 includes the dual shutter button interface 110 for displaying information to a user and for facilitating user interaction. In some embodiments, the dual shutter button interface 110 may be an electronic display such as an LCD or LED panel. The interface 110 may alternatively contain a selection means, such at least one button or a wheel, to allow a user to select options displayed on the interface 110. Some embodiments may employ touch sensitive technologies for the interface 110, and may employ touch sensitive selection means for options displayed on the interface 110.

The interface 110 includes image display portion 112. The image display portion 112 may be used to display, for example, raw data of a target image scene as a preview, to display processed data of a target image scene as a preview for the captured image with processing applied, or to display captured images. The image display portion 112 may also be used, in certain embodiments, to display an interactive menu of device and imaging options to the user.

Portrait context indicator 114 may at times be displayed on the image display portion 112 to indicate that the device 100 has recognized that a context of the target image scene has been determined to be portrait context. As illustrated, portrait context indicator 114 is displayed bounding the face of a single subject, however certain embodiments may employ multiple portrait context indicators 114 where multiple subjects are present. The device 100 may employ facial detection techniques known in the art to determine that the context is portrait and to generate the portrait context indicator 114. Portrait context indicator 114 may not be displayed when the device 100 has determined that no context is present or that the image scene is not a portrait but rather of a different context, for example landscape, night, low-light, high dynamic range, or sports/fast motion. A variety of other context indicators may be employed for some or all of these contexts.

The interface 110 also includes shutter buttons such as default shutter button 118 and context-specific shutter button 116. Although two buttons are depicted, the interface 110 may display only one button—the default shutter button 118—or may display more than two buttons, for example by displaying a second context-specific shutter button if the device 100 determines that the image scene is of more than one context, such as a night-time portrait scene. The default shutter button 118 is configured to capture images with default shutter settings that are balanced for use in many different contexts. When instructions or modules within the device 100 determine that the image scene is of a specific context, for example portrait, the context-specific shutter button 116 may be displayed, corresponding to capture and/or post-processing settings associated with the context. The context-specific shutter button 116 may be displayed with an icon indicating the context with which the button is associated. For example, if the context is portrait, the icon may be of a face. If the context is outdoors, the icon may be a mountain.

The user is thus presented with a time-saving context recommendation in the form of the context-specific shutter button 116, but ultimately has the choice of whether to capture the image using the context-specific settings or to capture the image using default settings. Selection of one of the shutter buttons indicates to the device 100 which settings the user would like to use for image capture and/or post-processing and activates the shutter to capture the image or video with the chosen settings.

In some embodiments, the shutter buttons 116, 118 may be configured with a plurality of press modes. For example, each button 116, 118 may have two press modes, a first press mode causing the device 100 to capture the image with the settings associated with the pressed button and a second press mode causing the user interface 110 to display a live preview to the user of the target scene with the associated settings applied to the scene. To illustrate, a quick press may be associated with a capture mode and a long press may be associated with a preview mode. If the recommended capture mode is "sunset," when the user presses and holds context-specific shutter button 116, then the color/exposure settings optimized for a sunset scene will be applied to a preview image displayed in the image display portion 112 so the user can view the scene with the sunset settings. In certain embodiments, if the user desires to capture the target scene with the sunset settings, release of the shutter button will cause the device 100 to capture the image with the sunset settings the desired effect. By moving or sliding his finger away from the button while still touching the screen, the user may then release his finger to avoid triggering the recommended capture mode. For embodiments employing a display 110 without touch sensitive technology, similar options may be achieved by physical buttons, for instance through a half-press mechanism.

Figure 2:
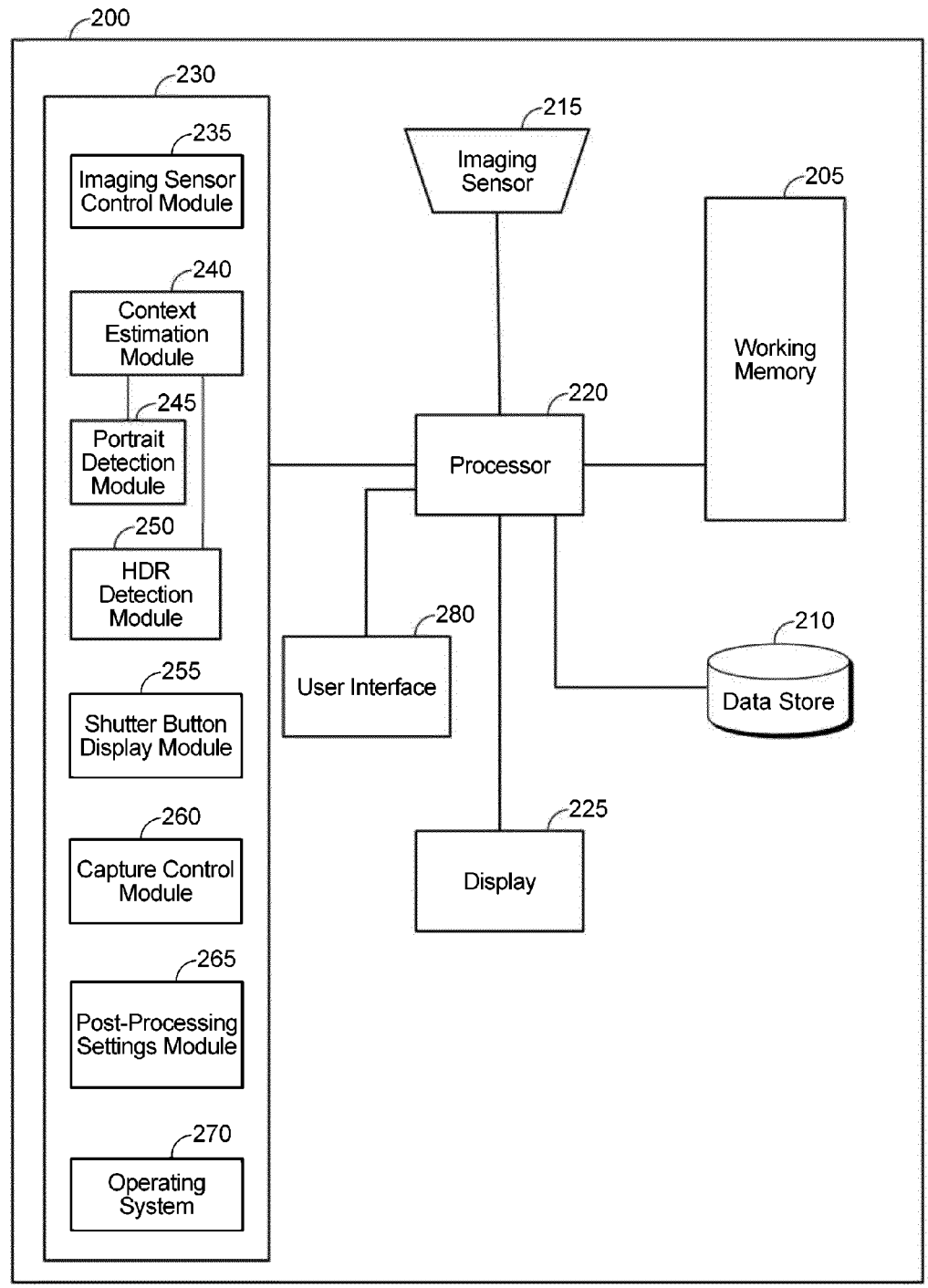
FIG. 2 illustrates an embodiment of an image capture system.

FIG. 2 depicts a high-level block diagram of a device 200 having a set of components including a processor 220 linked to an imaging sensor 215. A working memory 205, storage 210, electronic display 225, user interface 280, and memory 230 are also in communication with the processor 220.

Device 200 may be a cell phone, digital camera, tablet computer, personal digital assistant, or the like. Device 200 may also be a more stationary device such as a desktop personal computer, video conferencing station, or the like that uses an internal or external camera for capturing images. A plurality of applications may be available to the user on device 200. These applications may include traditional photographic applications, high dynamic range imaging, panoramic video, or stereoscopic imaging such as 3D images or 3D video.

The image capture device 200 includes the image sensor 215 for capturing external images. The image sensor 215 can be, for example, a charge-coupled device (CCD), a complementary metal-oxide semiconductor (CMOS) sensor, or the like. The image sensor 215 may be coupled to the processor 220 to transmit a captured image to the image processor 220. The image processor 220 may be configured to perform various post-processing operations on a received captured image in order to output a high quality image, as will be described in more detail below.

Processor 220 may be a general purpose processing unit or a processor specially designed for imaging applications. As shown, the processor 220 is connected to a memory 230 and a working memory 205. In the illustrated embodiment, the memory 230 stores an imaging sensor control module 235, context estimation module 240, portrait detection module 245, HDR detection module 250, shutter button display module 255, capture control module 260, post-processing settings module 265, and operating system 270. These modules include instructions that configure the processor to perform various image processing and device management tasks. Working memory 205 may be used by processor 220 to store a working set of processor instructions contained in the modules of memory 230. Alternatively, working memory 205 may also be used by processor 220 to store dynamic data created during the operation of device 200.

As mentioned above, the processor is configured by several modules stored in the memories. The imaging sensor control module 235 includes instructions that configure the processor 220 to adjust the focus position of imaging sensor 215. The imaging sensor control module 235 also includes instructions that configure the processor 220 to capture images with the imaging sensor 215. Therefore, processor 220, along with image capture control module 235, imaging sensor 215, and working memory 205 represent one means for capturing an image using an imaging sensor.

Context estimation module 240 is illustrated with two sub-modules, a portrait detection module 245 and HDR detection module 250. However, these modules are for illustrative purposes only and are not meant to provide a comprehensive list of all sub-modules used by context estimation module 240 to estimate the context of a target image scene. Portrait detection module 245 includes instructions that configure the processor 220 to recognize and identify faces in at least some of the subjects present in an image captured by imaging sensor 215. The portrait detection module 245 may use any of the facial detection methods known in the art to perform facial detection. HDR detection module 250 may include instructions that configure the processor 220 to detect light ranges exceeding a threshold dynamic range, and may also include instructions that configure the processor 220 to merge multiple low-dynamic-range or standard-dynamic-range images of the target image scene to provide a higher dynamic range between the lightest and darkest areas of the scene.

Shutter button display module 255 configures the processor 220 to handle display of a changing array of shutter buttons as will be explained more completely below. Certain embodiments of the device may operate in a menu mode, wherein the shutter button display module 255 would configure display 225 to not display any shutter buttons to the user. When the device 200 is in an image capture mode, shutter button display module includes instructions to display a default shutter button on display 225. Shutter button display module 255 may include instructions to display additional shutter buttons for each determination made by the context estimation module 240 that the target image scene corresponds to a specific context.

Capture control module 260 may include instructions that control the overall image capture functions of the device 200. For example, capture control module 260 may include instructions that call subroutines to configure the processor 220 to capture raw image data of a target image scene using the imaging sensor 215. Capture control module 260 may then call context estimation module 240 to determine an estimated context of the image scene. Capture control module 260 may then call shutter button display module 255 to display at least one additional shutter button based on the estimated scene context and to determine a user selection of a displayed shutter button, and may instruct the imaging sensor 215 to capture the target image scene using capture settings indicated by the user-selected shutter button. Capture control module 260 may then call subroutines within the post-processing settings module 265 to adjust the captured image with any context-specific post processing settings.

Post-processing settings module 265 may configure the processor 220 to adjust certain parameters of a captured image. These adjustments may be default adjustments applied to every captured image, or may be context-specific adjustments applied only to captured images which context estimation module 240 has determined correspond to a specific scene context.

Operating System module 270 configures the processor 220 to manage the memory and processing resources of device 200. For example, operating system module 270 may include device drivers to manage hardware resources such as the electronic display 225, user interface 280, storage 210, or imaging sensor 215. Therefore, in some embodiments, instructions contained in the image processing modules discussed above may not interact with these hardware resources directly, but instead interact through standard subroutines or APIs located in operating system component 270. Instructions within operating system 270 may then interact directly with these hardware components.

The processor 220 may be further configured to control the display 225 to display the captured image to a user. The display 225 may be external to the imaging device 200 or may be part of the imaging device 200. The display 225 may also be configured to provide a view finder for a user prior to capturing an image, or may be configured to display a captured image stored in memory or recently captured by the user. The display 225 may comprise an LCD or LED screen, and may implement touch sensitive technologies.

The processor 220 may also control the user interface 280. The user interface 280 may be implemented in whole or in part on the display 225. For example, where the display comprises touch sensitive technology, the user interface 280 may be implemented entirely on the display 225. In certain embodiments where touch technology is not used for the display 225, the user interface 280 may comprise a selection means such as buttons or a wheel.

Processor 220 may write data to storage module 210, for example data representing captured images. While storage module 210 is represented graphically as a traditional disk device, those with skill in the art would understand that the storage module 210 may be configured as any storage media device. For example, the storage module 210 may include a disk drive, such as a floppy disk drive, hard disk drive, optical disk drive or magneto-optical disk drive, or a solid state memory such as a FLASH memory, RAM, ROM, and/or EEPROM. The storage module 210 can also include multiple memory units, and any one of the memory units may be configured to be within the image capture device 200, or may be external to the image capture device 200. For example, the storage module 210 may include a ROM memory containing system program instructions stored within the image capture device 200. The storage module 210 may also include memory cards or high speed memories configured to store captured images which may be removable from the camera.

Although FIG. 2 depicts a device comprising separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 2 illustrates two memory components, to include memory component 230 comprising several modules, and a separate memory 205 comprising a working memory, one with skill in the art would recognize several embodiments utilizing different memory architectures. For example, a design may utilize ROM or static RAM memory for the storage of processor instructions implementing the modules contained in memory 230. Alternatively, processor instructions may be read at system startup from a disk storage device that is integrated into device 200 or connected via an external device port. The processor instructions may then be loaded into RAM to facilitate execution by the processor. For example, working memory 205 may be a RAM memory, with instructions loaded into working memory 205 before execution by the processor 220.

Figure 3:
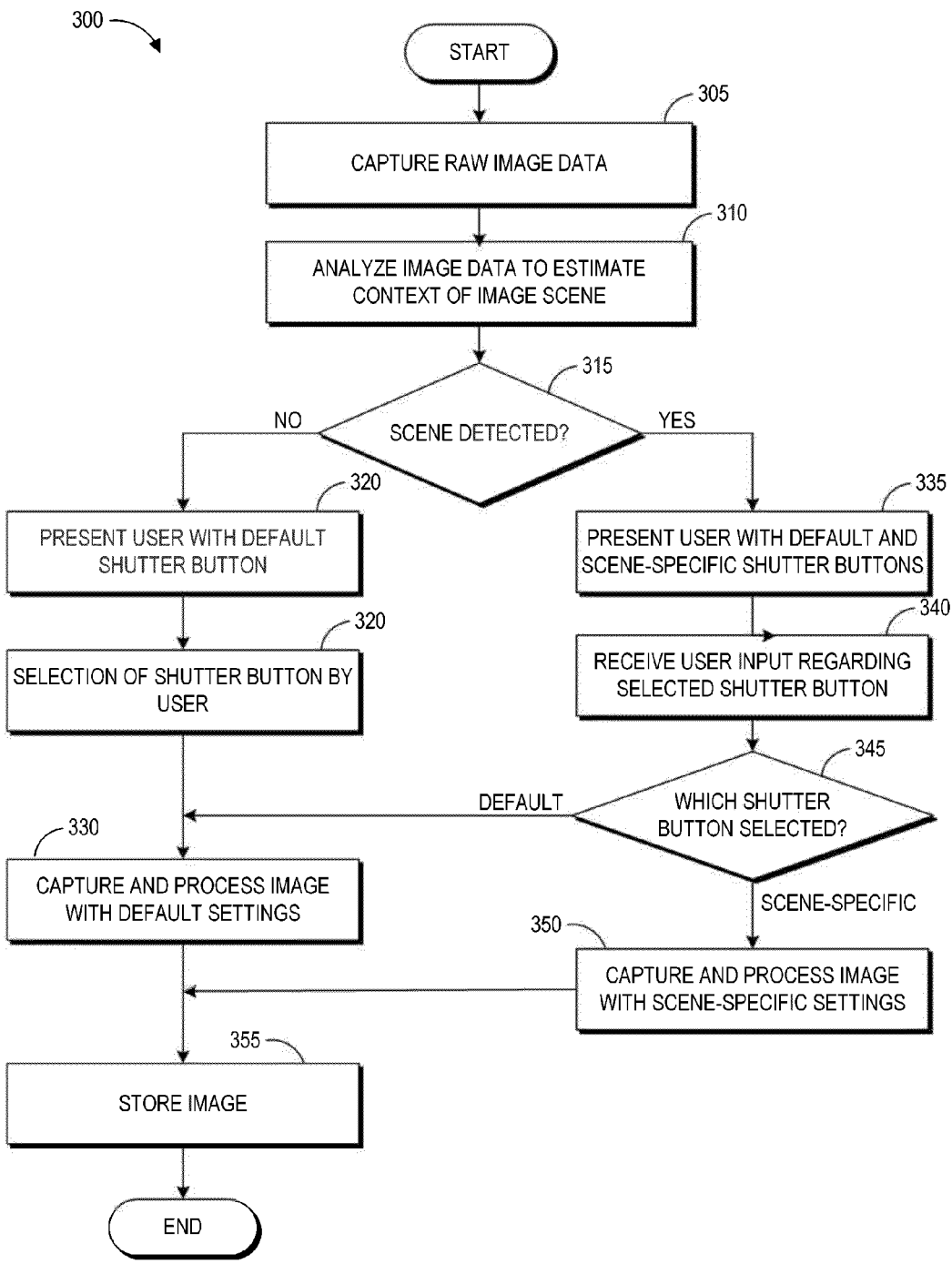
FIG. 3 illustrates an embodiment of an image capture process employing dual shutter buttons.

A dual shutter button image capture process 300 will now be described with greater detail with respect to FIG. 3. The process 300 begins at block 305 where raw image data of a target image scene is captured. Raw image data is generated, in certain embodiments, where imaging sensor control module 235 configures the processor 220 to control imaging sensor 215 to temporarily store data of a target scene in the working memory 205. The data may be updated as the target scene changes, for example as the subjects of the scene move or the user points the device at a new target scene. As will be appreciated by those skilled in the art, "raw image data" may be stored in a variety of formats and generally refers to the data generated by or captured by the sensor 215 of the imaging device 200.

The process 300 then moves to block 310, where the raw image data is analyzed to determine the scene context. This may be performed by the context estimation module 240 of FIG. 2. More details on estimating context can be found below with reference to FIG. 5. At decision block 315, instructions determine if a context has been associated with the image scene. If a context is not detected, process 300 moves to block 320 where the user is presented with a default shutter button. Embodiments of the context estimation process are described in more detail in the explanation of FIG. 5 below. Presentation of the shutter button may be performed by shutter button display module 255 calling the processor 220 to display the shutter button on display 225, as described in more detail below with respect to FIG. 6. The process 300 moves to block 320, where selection of the shutter button by the user causes the process to transition to block 330. At block 330, the target image scene is captured with the default capture settings and processed with default post-processing settings associated with the default shutter button.

Capturing the image may be accomplished through the capture control module 260 sending instructions to the processor 220 for the imaging sensor control module 235 to configure the imaging sensor 215 according to default capture settings. Capture settings may include flash, exposure, focus, f stop, white balance and the like. Capture control module 260 may also send instructions to post-processing settings module 265 to adjust the captured image with any default post processing settings. Post-processing settings include contrast adjustments, color enhancement, merging of multiple exposures, etc. The process 300 then ends after storing the image at block 355.

At decision block 315, if a context is detected for the scene, the process 300 moves to a block 335 wherein the display is updated to have the default shutter button and also an additional context-specific shutter button corresponding to each context associated with the image scene. The process then moves to block 340, where user input is received regarding shutter button selection. This typically occurs when a user activates a button by a touch movement, or menu selection on the display device. At decision block 345, it is determined which shutter button is selected by the user. User interface module 280 of FIG. 2 may perform this step by determining whether the default or a context-specific shutter button was selected and sending instructions to processor 220 to carry out image capture and post-processing with the settings associated with the selected shutter button.

If the default shutter button was selected, the process 300 loops through steps 330 and 335 as described above. If a context-specific shutter button was selected, the process transitions to block 350 where the target image scene is captured with the capture settings and processed with post-processing settings associated with the context-specific shutter button. The process 300 then ends after storing the image at block 355.

Figure 4:
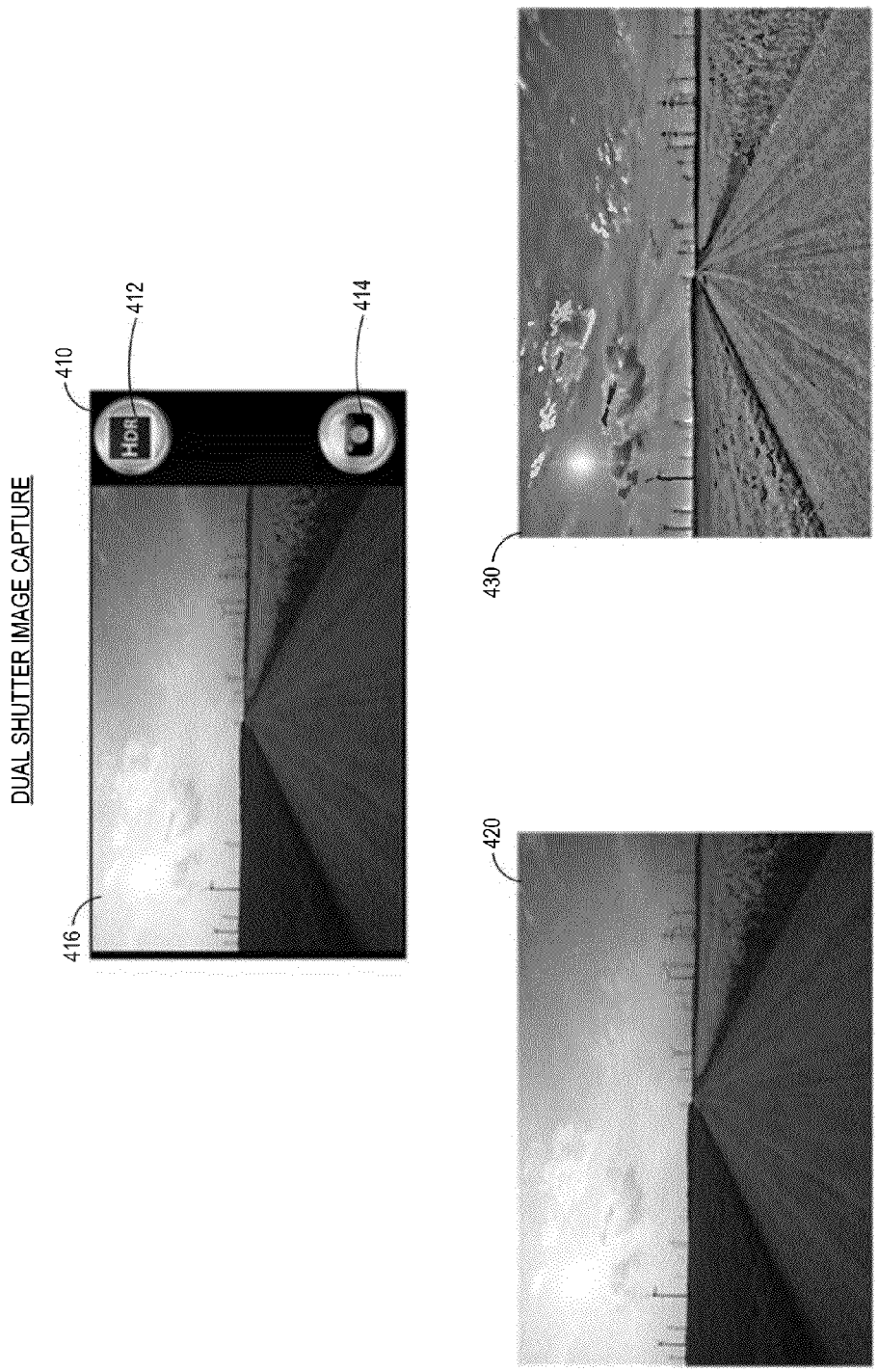
FIG. 4 illustrates an embodiment of images produced by the different shutter buttons of a dual shutter button image capture system.

FIG. 4 illustrates an embodiment of the dual shutter button interface and provides examples of images produced by the different shutter buttons. The interface 410 includes image display portion 416, HDR shutter button 412, and default shutter button 414. The image display portion 416 may be used to display, for example, raw data of a target image scene as a preview, to display processed data of a target image scene as a preview of the captured image with processing applied, or to display captured images. The illustrated configuration of these elements is meant to show one of many possible configurations, for example the buttons 412, 414 may be on the other side of, above, or below the image display portion 416, and the buttons 412, 414 may change position relative to one another.

When the user selects the default shutter button 414, captured image 420 is generated according to the default capture and post-processing settings. When the user selects the HDR shutter button 412, captured image 430 is generated according to the capture and post-processing settings associated with the HDR context. In some embodiments, there may be a preview selection method, for example tapping a shutter button once, by which the user indicates a desire to see a preview image of the target scene with the settings associated with the shutter button applied. Image 420 may be displayed on the image display portion 416 in response to using the preview selection method with default shutter button 414. Image 430 may be displayed on the image display portion 416 in response to using the preview selection method with HDR shutter button 412. In addition to the preview selection method, there may be a capture selection method, for example pressing and holding a shutter button, indicating that the device should capture and store the target scene with the settings associated with the shutter button.

Figure 5:
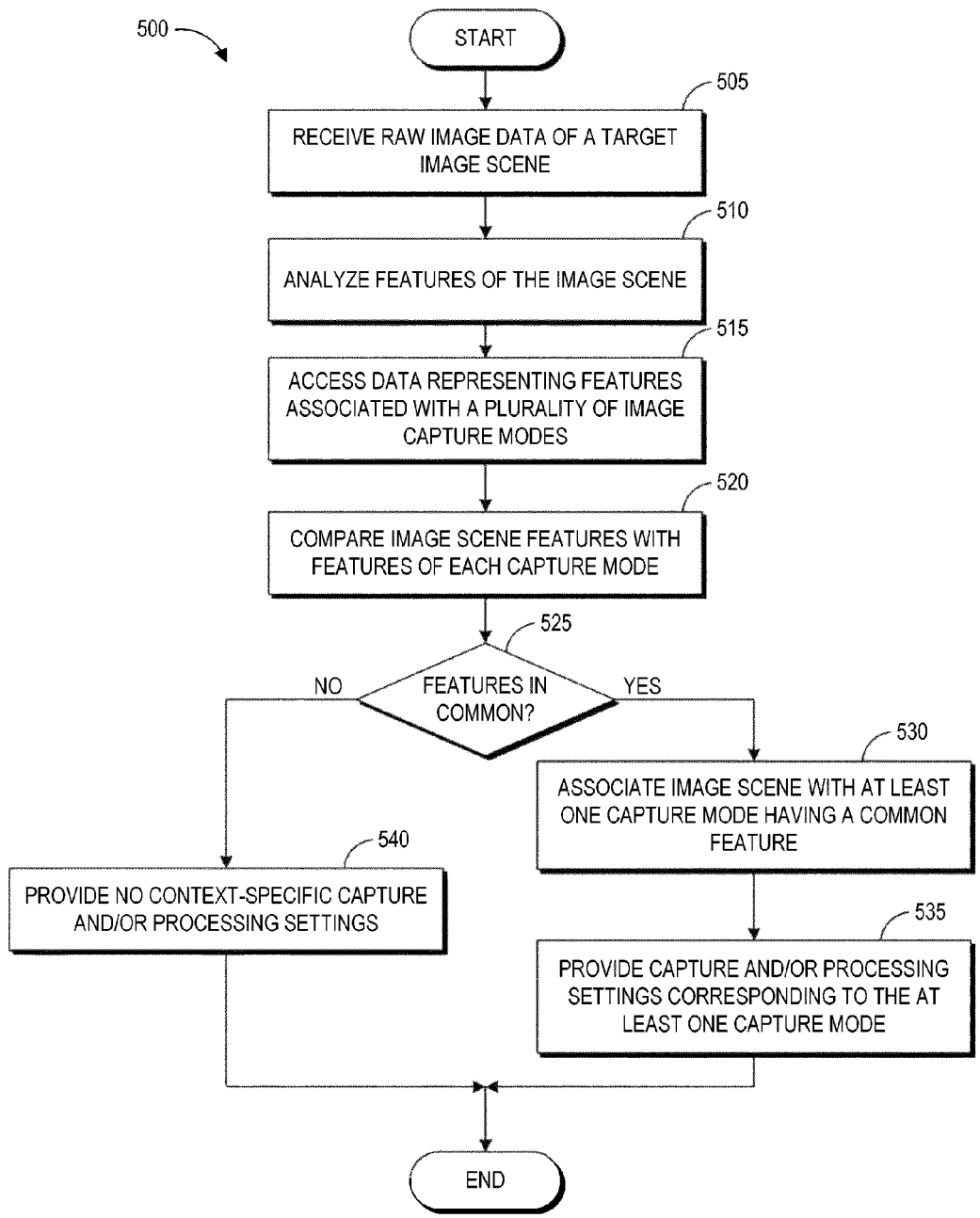
FIG. 5 illustrates an embodiment of a context estimation process.

FIG. 5 is a flow chart illustrating a context estimation process 500 that runs within one embodiment of the context estimation module 240 of FIG. 2. The process 500 begins at block 505 where raw image data of a target image scene is received. The process then moves to block 510 where the context estimation module 240 analyzes features of the image scene for markers or features associated with a plurality of scene contexts. For example, context estimation module 240 may use known facial detection techniques to determine that a human face is present in the target image scene. In some embodiments, context marker recognition may be continuously performed until a particular capture mode has been selected. In other embodiments, feature or marker recognition processes may be executed only upon a determination that the target image scene has changed.

At block 515, the context estimation module 240 accesses data representing features or markers associated with a plurality of image capture modes, for example with portrait, night, or macro capture modes. This information may be stored in data store 210 of FIG. 2. The process 500 then transitions to step 520 where the recognized scene features or markers are compared to the data. At decision block 525, the context estimation module 240 determines whether the analyzed image scene has features in common with any of the plurality of capture modes. If there are no features in common, the process 500 moves to block 540 where no context-specific capture or post-capture processing settings are returned and the context estimation process ends. If the analyzed image scene does have a feature or features in common with any of the plurality of capture modes, the process moves to block 530 where the image scene is associated with the capture modes with which it shares common features.

At step 535, the context estimation module 240 provides capture and/or post-processing settings corresponding to the capture mode or capture modes associated with the image scene at step 530. Capture and post-processing settings for each context are substantially optimized for image capture of a scene associated with that context. For example, the night capture mode is a mode suitable for capturing an image in low light while emphasizing an ambience such as an evening view or a night view, and may have a long exposure or employ flash. Sports mode is suitable for capturing an image of a moving object and may have a short exposure time for image capture. Landscape mode is suitable for shooting an image of a landscape such as a building or a mountain in the daytime and may have long distance focus settings. Portrait mode is suitable for shooting a portrait image, and may have color settings optimized to capture and process the tones of a flesh color, and may also include special focus settings which recognize and focus the imaging device lens on facial features. In one embodiment, the context estimation module 240 provides these settings to the processor 220 for utilization when the capture control module 260 calls the imaging sensor control module 235 and post-processing settings module 265 to perform image capture and post-capture processing.

Figure 6:
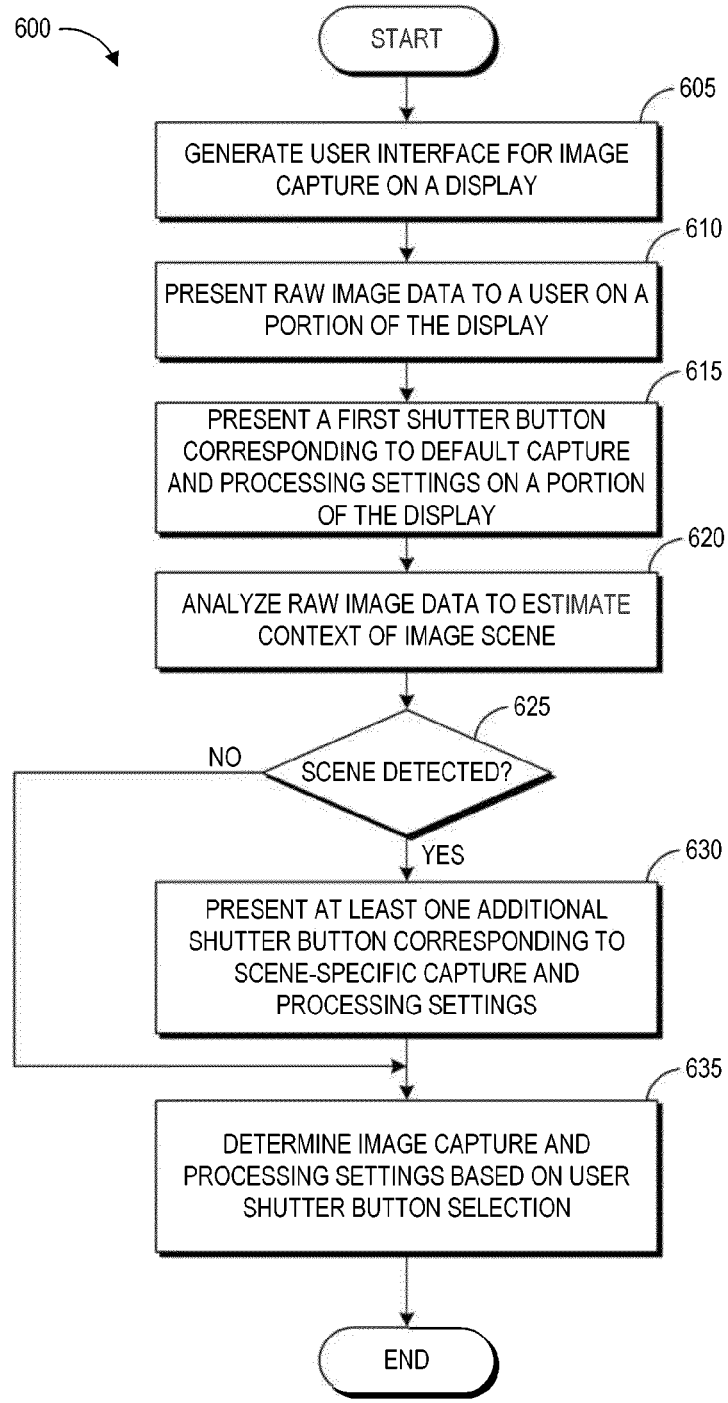
FIG. 6 illustrates an embodiment of a dual shutter button display process.

FIG. 6 represents an embodiment of a dual shutter button display process 600. The process 600 may be implemented by instructions contained in shutter button display module 255 of device 200, illustrated in FIG. 2. Process 600 begins when shutter button display module 255 generates a user interface suitable for image capture on a display. This step may be carried out in conjunction with user interface 280 and display 225 of FIG. 2. At step 610, some embodiments of process 600 present raw image data to a user on a portion of the display. The process 600 at step 615 presents a first shutter button on a portion of the display, the first shutter button corresponding to default capture and post-capture processing settings. These settings may be provided by capture control module 260 in some embodiments, or in other embodiments may be retrieved from data store 210. At block 620, raw image data is analyzed to determine the image scene context as described above in FIG. 6.

The shutter button display process 600 determines at decision block 620 whether a specific image scene context has been detected. If no context is detected, the process 600 ends and the user is presented only with the default shutter button. If a context or contexts are detected, the process 600 at step 630 generates an additional shutter button corresponding to the context or contexts for presentation to the user on the display. Each context-specific shutter button corresponds to capture and/or post-capture processing settings for the context. The shutter button display module 255 may determine a unique look for each context-specific shutter button to indicate the context with which the button is associated. For example, a shutter button associated with a portrait context may be displayed with a silhouette of a human head or face profile to indicate that the shutter button will apply portrait settings to the captured image. A shutter button associated with a landscape context may display a symbol representing a mountain range, a shutter button associated with a night context may display a symbol such as a moon, etc. This indicates to the user which context has been estimated for the target image scene as represented by the context-specific shutter button.

Figure 7:
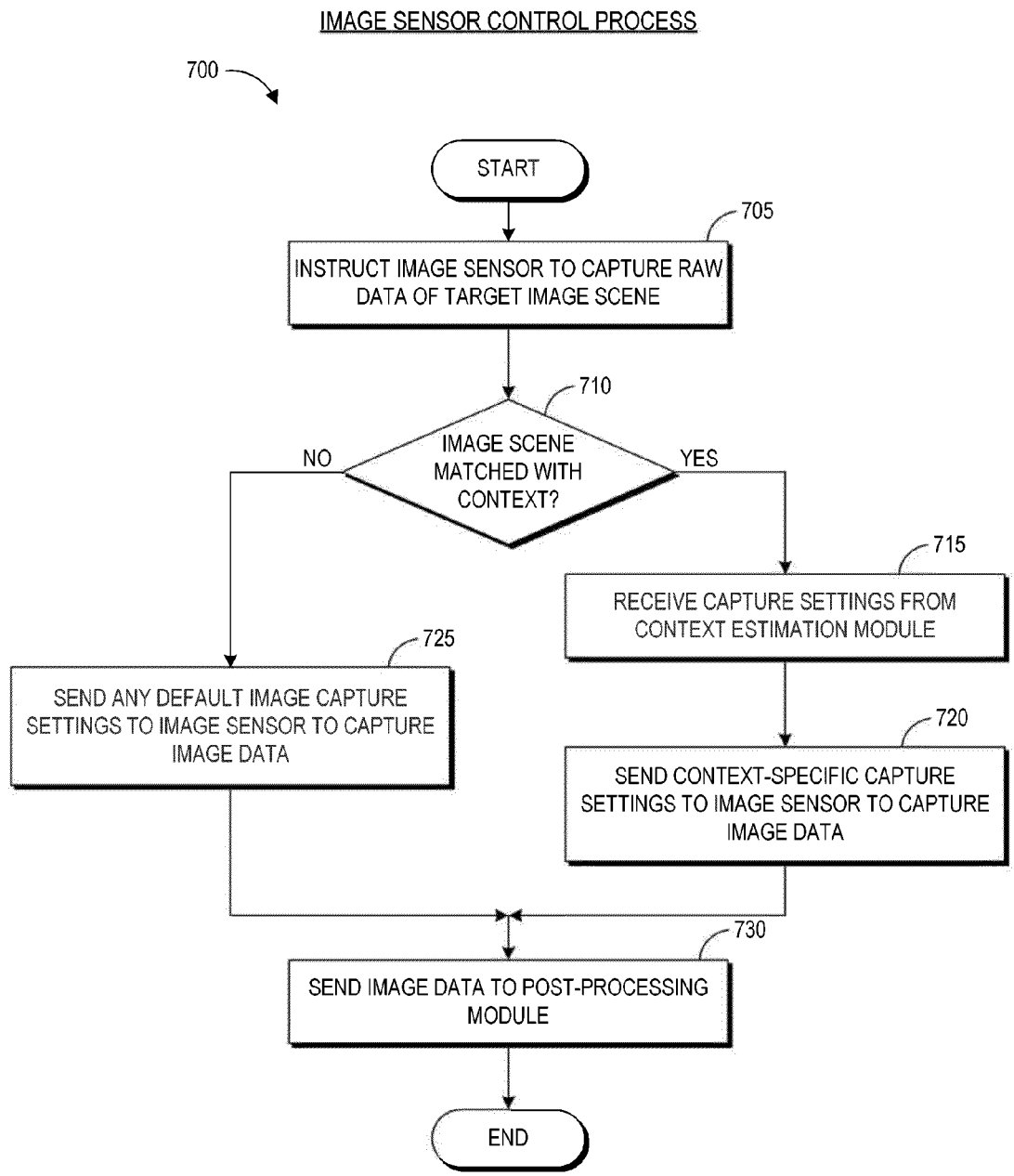
FIG. 7 illustrates an embodiment of an image sensor control process.

FIG. 7 illustrates an embodiment of an image sensor control process which may be implemented by capture control module 260 and imaging sensor control module 235 of FIG. 2. At block 705, the imaging sensor control module instructs imaging sensor 215 to capture raw data of a target image scene. As discussed above, raw image data is generated, in certain embodiments, where imaging sensor control module 235 configures the processor 220 to control imaging sensor 215, possibly via operating system module 275, to temporarily store data of a target scene in the working memory 205. Certain embodiments may update the raw data repeatedly as the target scene changes, for instance as lighting changes, as subjects of the scene move, or as the user reframes the scene or points the device 200 at a new target scene. Capture control module 260 determines at decision block 710 whether the context estimation process 500 described in FIG. 5 matched the image scene with at least one context.

If no matching context was found, the process 700 transitions to block 725 where the capture control module 260 calls imaging sensor control module 235 to configure the imaging sensor 215 according to default image capture settings. If a matching context was found, the capture control module 260 at block 715 receives context-specific capture settings from the context estimation module 240 and calls imaging sensor control module 235 to configure the imaging sensor 215 according to the context-specific capture settings at block 720. The process ends at block 730 where data representing the captured image is stored in preparation for post-capture processing.

Figure 8:
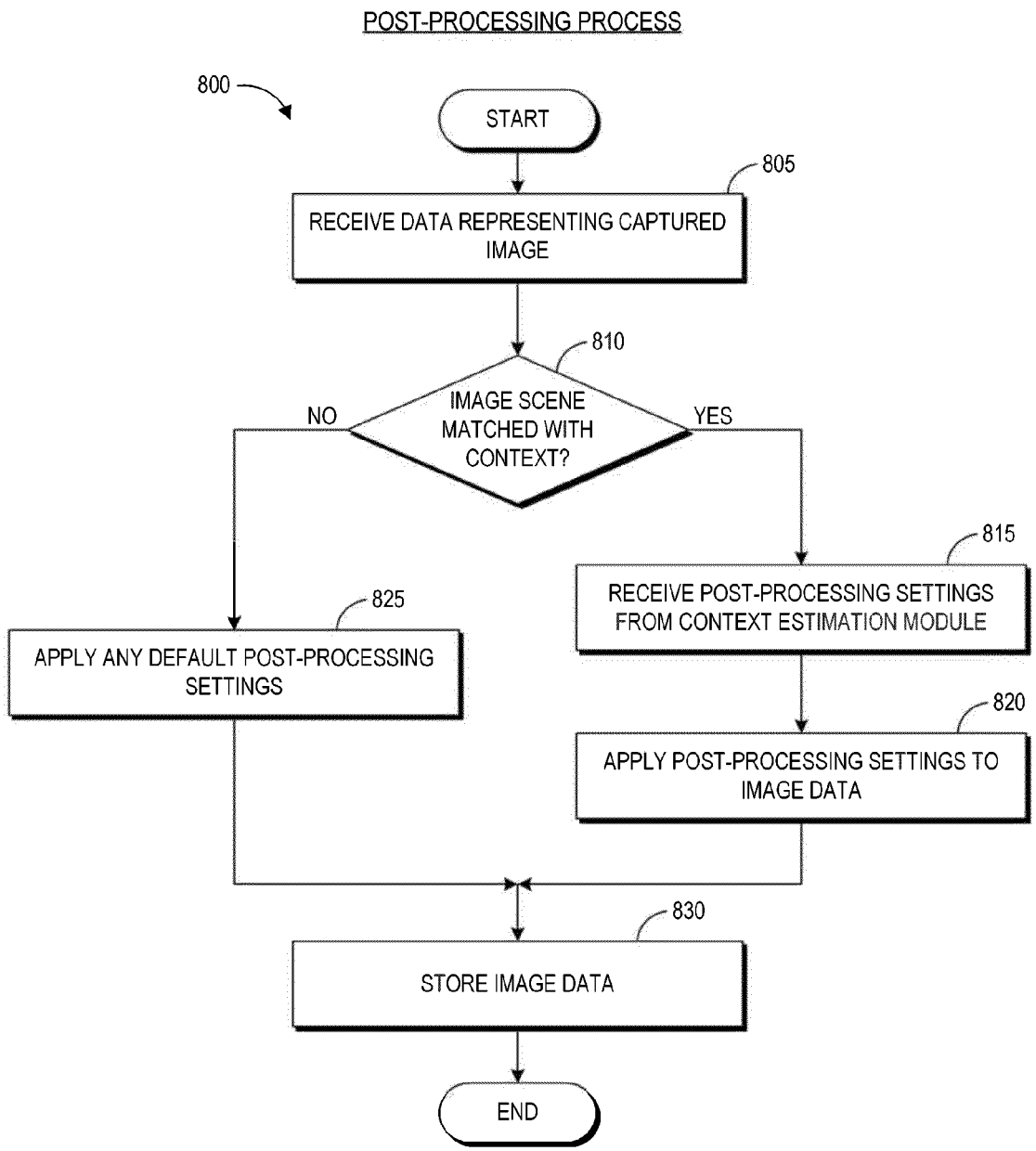
FIG. 8 illustrates an embodiment of a post-processing process.

The post-capture processing process 800 illustrated in FIG. 8 follows the image capture process 700 described in FIG. 7 in some embodiments. This process 800 may be carried out by the capture control module 260 and post-processing settings module 265 of FIG. 2. To begin, the process 800 receives, at step 805, data representing the captured image. This data may be generated by image capture process 700 described above.

Capture control module 260 determines at decision block 810 whether the context estimation process 500 described in FIG. 5 matched the image scene with at least one context. If no matching context was found, the process 800 transitions to block 825 where the capture control module 260 calls post-processing settings module 265 to process the captured image data according to default image processing settings. If a matching context was found, the capture control module 260 at block 815 receives context-specific post-capture processing settings from the context estimation module 240 and post-processing settings module 265 to process the captured image data according to context-specific image processing settings at block 820. The process ends at block 830 where data representing the captured and processed image is stored, for example in the data store 210 of device 200.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. An image capture system having a processor and a display, comprising:
an image sensor configured to capture a target image of a scene;
an image analysis module configured to determine at least one context for the scene of the target image;
a data storage configured to store the target image; and
a user interface configured to display at least one shutter button that when selected by a user captures and stores the target image to the data storage using first settings, and wherein, in response to the determination of the context of the scene, the user interface also displays at least one additional shutter button that when selected by the user captures and stores the target image to the data storage using second settings, the second settings associated with the context.

2. The system of claim 1, wherein the user interface is further configured to receive user feedback regarding the at least one shutter button or the at least one additional shutter button.

3. The system of claim 1, further comprising a capture module configured to apply, for capture of the target image, either a subset of the first settings for image capture or a subset of the second settings for image capture, based on the at least one shutter button or the at least one additional shutter button.

4. The system of claim 1, further comprising a processing module configured to apply either a subset of the first settings for post-processing or a subset of the second settings for post-processing to the target image based on with a selected shutter button the at least one shutter button or the at least one additional shutter button.

5. The system of claim 1, wherein the image capture device is a mobile communications device, a digital camera, or a video camera.

6. The system of claim 1, wherein the user interface comprises a touch interface and one or both of the at least one shutter button and the at least one additional shutter button comprise a touch sensitive shutter button.

7. The system of claim 1, wherein the user interface comprises a flat-panel display and a menu selection device.

8. The system of claim 1, wherein the image analysis module is configured to determine a context of a landscape scene, a portrait scene, a night scene, a low-light scene, a high dynamic range scene, or a sports scene.

9. The system of claim 1, wherein the storage module comprises solid state memory.

10. The system of claim 9, wherein the solid state memory comprises flash memory.

11. A non-transitory computer readable medium comprising instructions that when executed by a processor perform a method comprising:
capturing raw data representing the target image;
analyzing the raw data to determine a context of the scene of the target image;
displaying a first shutter button on a user interface that when activated by a user captures and stores the target image to a data storage using first settings;
displaying a second shutter button on the user interface that when activated by the user captures and stores the target image to the data storage using second settings associated with the determined context;
determining whether the first shutter button or the second button is activated by the user; and
capturing and storing the target image to the data storage using the first settings corresponding to the first shutter button when the first shutter button is activated, or capturing and storing the target image to the data storage using the second settings corresponding to the second shutter button when the second shutter button is activated.

12. An image capture system having a processor and a display, comprising:
means for capturing a target image of a scene;
means for determining at least one context for the scene of the target image;
means for storing the target image; and
means for displaying at least one shutter button that when selected by a user captures and stores the target image to the means for storing using first settings, said means further configured to display, in response to the determination of the context of the scene, at least one additional shutter button that when selected b the user captures and stores the target image to the means for storing using second settings associated with the context.

13. The system of claim 12, wherein the first settings comprise default image capture and/or processing settings.

14. The system of claim 12, further comprising means for a user selecting a shutter button.

15. The system of claim 12, wherein the means for displaying at least one shutter button comprises a touch interface and one or both of the at least one shutter button and the at least one additional shutter button comprises a touch sensitive shutter button.

16. The system of claim 12, wherein the means for determining at least one context comprises a context estimation module comprising instructions configured to be run on a processor.

17. A method of capturing a target image of a scene, the method comprising:
capturing raw data representing the target image;
analyzing the raw data to determine a context of the scene of the target image;
displaying a first shutter button on a user interface that when activated by a user captures and stores the target image to a data storage using first settings;
displaying a second shutter button on the user interface that when activated by the user captures and stores the target image to the data storage using second settings associated with the determined context;
determining whether the first shutter button or the second button is activated by the user; and
capturing and storing the target image to the data storage using the first settings corresponding to the first shutter button when the first shutter button is activated, or capturing and storing the target image to the data storage using the second settings corresponding to the second shutter button when the second shutter button is activated.

18. The method of claim 17, wherein capturing and storing the target image to the data storage further comprises applying one or both of image capture settings and post-processing settings corresponding to the activated shutter button.

19. The method of claim 17, further comprising estimating a second context and displaying a third shutter button that when activated by the user captures and stores the tar et image to the data storage using third settings associated with the second context.

20. The method of claim 17, further comprising displaying preview images to the user.

21. The method of claim 17, wherein analyzing the raw data to determine a context of the scene of the target image comprises the step of determining the context is a landscape scene, a portrait scene, a night scene, a low-light scene, a high dynamic range scene, or a sports scene.

22. The method of claim 17, wherein capturing the target image further comprises receiving data regarding user selection of one of the first or second shutter buttons.

\* \* \* \* \*